O. P. CRAWFORD.
Reaping Machine.
No. 43,101.
Patented June 14, 1864.
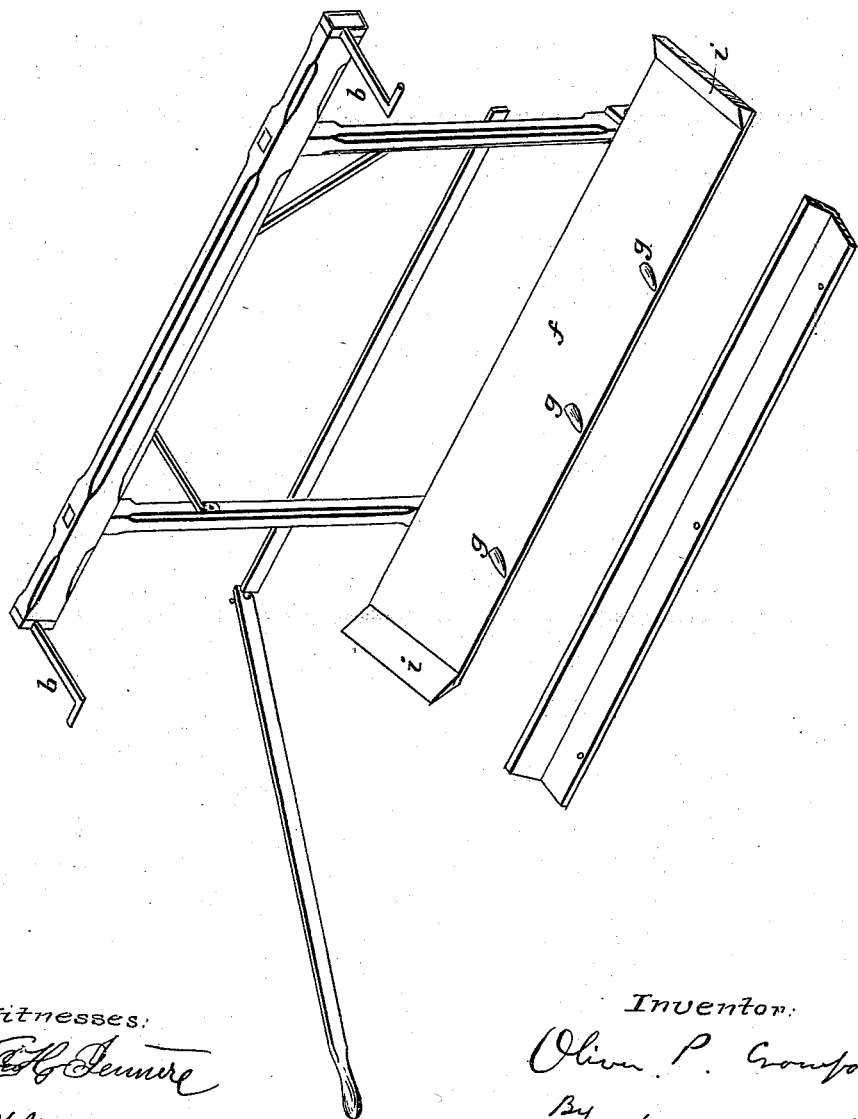

UNITED STATES PATENT OFFICE.

OLIVER PERRY CRAWFORD, OF WABASHAW COUNTY, MINNESOTA.

IMPROVEMENT IN REAPING-MACHINES.

Specification forming part of Letters Patent No. 43,101, dated June 14, 1864.

*To all whom it may concern:*

Be it known that I, OLIVER PERRY CRAWFORD, of Wabashaw County, in the State of Minnesota, have invented a new and useful Improvement in the Method of Constructing a Swinging Platform for Grain-Reapers; and I do hereby declare that the following is a full, clear, and exact description of the construction and operation of the same, reference being had to the annexed drawing, making a part of this specification, in which the figure 1 is a perspective view and represents my invention in all its parts.

$b$ $b$ represent two elevating-hinges, upon which the platform swings, and by which it is made to rise over the grain as it returns to its position, of the form and secured in the manner shown in the annexed drawing, or the equivalent; and $f$ represents the apron which receives and discharges the grain, and which is provided with teeth $g$ $g$ $g$ and flanges $i$ $i$, by which the grain is gathered and held.

My improvement may be attached to any reaping-machine now in use. It is very light and easily operated. It will save the labor of two men in harvesting, and will also save a large amount of grain which usually otherwise is wasted. By the construction and arrangement of the hinges $b$ $b$, from which the swinging apron is suspended, the grain can be completely controlled and deposited upon the ground in any sized bundles desirable, and by the construction of the apron $f$, with its teeth $g$ $g$ $g$ and flanges $i$ $i$, the grain is held in its proper position while passing over uneven as well as level ground.

I do not claim the swinging platform as attached to grain-reapers, as such constructions have heretofore been known; but What I do claim as my invention, and desire to secure by Letters Patent, is—

1. The construction, attachment, and arrangement of the hinges $b$ $b$, from which the swinging apron is suspended to receive the grain, substantially as and for the purpose described.

2. The construction of the apron $f$ with its teeth $g$ $g$ $g$ and flange $i$ $i$, on which the grain is received when cut by the sickle, substantially as and for the purpose described.

OLIVER PERRY CRAWFORD.

Witnesses:
D. ROWLAND,
R. CRAWFORD.